Oct. 31, 1950     R. J. HARDY     2,527,547
SELF-CONTAINED RADIO GUIDING APPARATUS FOR MOBILE CRAFT
Filed May 15, 1943
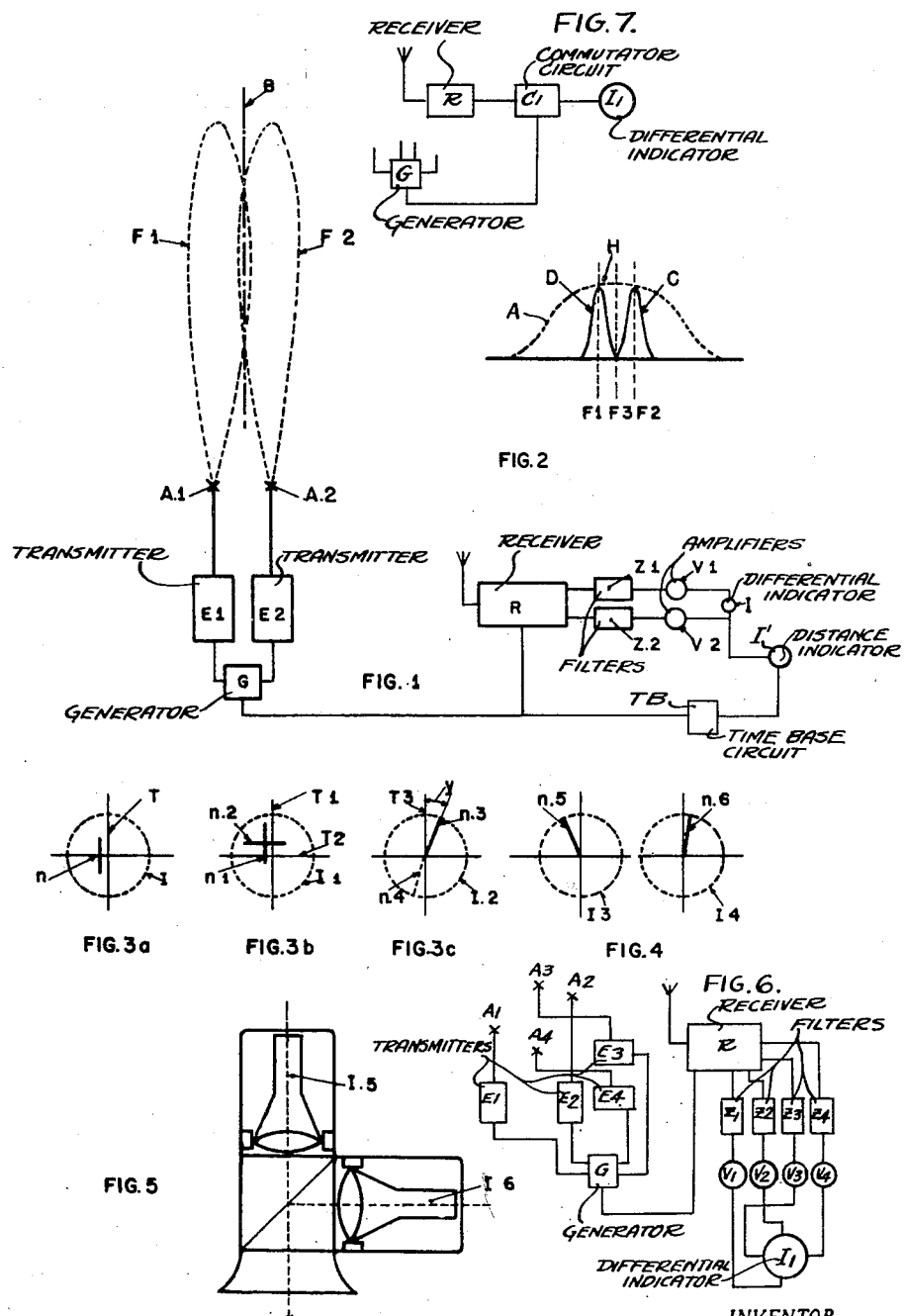
INVENTOR.
RENÉ J. HARDY
BY Robert J. Berry
AGENT Patented Oct. 31, 1950

2,527,547

UNITED STATES PATENT OFFICE 2,527,547

SELF-CONTAINED RADIO GUIDING
APPARATUS FOR MOBILE CRAFT

René Jean Hardy, Lyon, France, assignor to International Standard Electric Corporation, New York, N. Y., a corporation of Delaware Application May 15, 1943, Serial No. 487,198
In France February 10, 1941

Section 1, Public Law 690, August 8, 1946
Patent expires February 10, 1961

9 Claims. (Cl. 343—11)

The present invention refers to radio-guiding means for mobile vehicles, such as airplanes, and particularly means on board a mobile vehicle to enable the pilot to guide it among a certain number of obstacles or towards one of these obstacles if so desired, for example, towards a landing field.

Means have been described for guiding a mobile vehicle from radio-transmitters on the ground associated in pairs so as to supply the mobile vehicle with visual indications giving its displacement in relation to one or two given points by the intersections of the axes or intersection planes of the transmissions coming from the ground.

The present invention's main idea is to provide radio-guiding systems in which the above mentioned means are utilized, the arrangements being such that the complete radio-electrical equipment (transmitters and receivers) is located on board the mobile vehicle.

One of the characteristics of the invention is in the combination of a certain number of directional radio-electrical transmitters operating on different frequencies, said transmitters being associated by pairs to a wide band receiver whose selective qualities are such that the two wave lengths corresponding to the two transmitters in question are received simultaneously and utilized to operate a differential indicator giving a visual indication of the position of the mobile vehicle in relation to the intersection plane of the directive diagrams of these two transmitters.

Another characteristic of the invention is in the use of impulses for said transmitters instead of using a continuous transmission, these impulses being reflected by certain obstacles and sent backwards to operate the above mentioned receiver.

The invention will be described completely in the following description given in relation to the enclosed drawings in which:

Fig. 1 represents a schematic layout of a system to detect obstacles or for radio-guiding mobile vehicles incorporating the characteristics of the invention;

Fig. 2 represents the selectivity curve of the radio receiver that is in use;

Figs 3a, 3b and 3c represent different types of indications which can be obtained on a cathode ray oscillograph;

Fig. 4 represents an arrangement to combine by observation the indications of the two oscillographs, and Fig. 5 represents the combination of the two cathode ray indicators, one giving simultaneously the position of a certain number of obstacles, and the other one the position of an obstacle that is chosen in relation to the axis of the airplane.

Fig. 6 shows the circuit of Fig. 1 with the addition of a second pair of antennas to produce overlapping beams substantially at right angles to the beams of the first pair.

Fig. 7 shows the use of a commutating device synchronized with the transmitters.

The devices to be described enable one to know the direction of an airplane and the angle it makes with the vertical line; in other words, its direction in the two horizontal and vertical planes in relation to one or several obstacles or to a landing field. It is clear nevertheless that such devices can be used on the ground for the detection of airplanes around a landing field.

Fig. 1 represents, as an example, a scheme of two transmitters E1, E2 feeding transmitting aerials A1, A2. These transmitters operate respectively at different frequencies, for example F1 and F2. The curves F1 and F2 represent, as an example, the orientation of the transmission of the antennas and are such that in the bisecting axis B, there is an axis of equal intensity for the two directional lobes. The two transmission frequencies F1 and F2 are near each other but not identical; the transmission can be made of, or preferably realized by, successive impulses with a space between them, forming pulses of radiated energy.

A generator G, of any appropriate type can be used in order to feed successively E1 and E2 for complementary periods or simply during very short periods alternatively. The generator G can be such that it will send successively a pulse on E1 and after a certain length of time, another pulse on E2, and again to E1 and so forth.

Close to these transmitters, in a suitable place of the mobile vehicle (or on the ground if the complete system is on the ground) there is a receiver R having particular characteristics which will be explained further on. The receiver R is supposed to receive the echos or signals coming from the transmitters E1 and E2 and reflected by an obstacle (or by the airplane whose direction is being sought). This receiver R is made according to known means so as to have a selectivity such that the two frequencies F1 and F2 from E1 and E2 are included in the wide pass band of this receiver.

In Fig. 2 there is represented at H the supposed pass band of the receiver. F3 is the frequency to which the receiver is tuned, being for example, the average of frequencies F1 and F2 of the transmitters E1 and E2. After the wide pass band receiver, there are two filters that may or may not be amplifiers Z1 and Z2 which assure the discrimination of the frequencies. The pass band for each one of these filters Z1, Z2 is such that the pass band of the filter Z1 (Fig. 1) corresponds to the pass band D (Fig. 2) and obviously helps the reception of the transmission from E1, whereas the filter Z2 having the pass band C helps the transmission from E2. The detected signals are amplified with appropriate circuits V1, V2 and feed a differential indicator. This can be done by using any appropriate known means, and it enables one to know which of the two transmissions E1 or E2 is received with the greatest intensity. It is then possible to know if the searched obstacle or airplane is located to the left or to the right of the bisecting plane B. By using two oriented suitable directive devices and high gain amplifier, one knows the actual direction of the obstacle in relation to the bisecting plane, the amplification of the two frequencies being the same in the wide band receiver, and the circuits being such that the amplification is maintained at an equal value for the two transmitted frequencies by a suitable adjustment of the receiver. In this way, reading errors are avoided, since with large amplification the errors are correspondingly amplified. The differential action of the indicating circuit is as a consequence more precise since a greater amplification can be obtained.

In order to obtain the wanted indications, various indicating instruments can be used, preferably a cathode ray tube having a vertical line T, Fig. 3a, serving as a reference mark. By applying the differential output of the receiver on a pair of deflecting plates, one obtains (for example) a vertical line $n$, which, according to the ratio of the intensity of the signals received from the transmitters E1, E2, will be located to the left or to the right of the line T. This line $n$ can be obtained by combining successively the alternate pulses from the transmission E1 and E2 which come back on to the receiver R and which are separated by the filters Z1 and Z2 in circuits with appropriate time constant devices and forming a part, for example, of the amplifiers V1, V2. These circuits V1, V2 are each connected to one horizontal deflecting plate of the cathode ray tube; the spot is then located in a position that is proportional to the difference of the potential of each one of the plates. In order to have a clearer reading of the position of the spot, an alternating potential is applied to the vertical plates which transforms the point image of the spot into a line $n$. The circuits of the receivers are adjusted in such a way that the line $n$ is in coincidence with the line T when the obstacle or the sought airplane is located in the bisecting plane B. The slightest difference of D. C. potential of the circuits V1, V2 will correspond to a displacement that will be to the right or to the left of the line $n$ in relation to the reference mark T.

According to a characteristic of the invention, pulses are utilized for the control of the transmitters in order to give a large instantaneous value to the radiated power and to obtain a longer range for the same size of installation than would be obtained by feeding continually the antennas A1, A2. A system of this type can nevertheless be operated with continuous transmissions without leaving the field of the invention.

According to another characteristic of the invention, a circuit TB with linear or circular base on another cathode ray tube I' can be used (it being suitably fed by the receiver R or by a separate receiver), in order to know the time that it takes for the pulses to go towards the obstacle and come back, causing a luminous line to appear on this second cathode ray indicator showing at what distance the sought obstacle is located. It is still possible, by the use of a circuit with which one can alternate the indication of direction and the indication of the distance, to obtain by a persistent impression on the retina, on the same cathode indicator I, the indication of the direction which is shown as a vertical line, for example, (or having another form) and the indication of the distance by means of a circular base with a track which indicates the distance.

According to another characteristic of the invention, it is also possible to obtain the direction of the pursued obstacle in two planes, for example, an horizontal plane and a vertical plane, by suitably alternating the transmissions of four directives, one pair operating in the horizontal plane and the other in the vertical plane. Fig. 6 shows the circuit of Fig. 1 with the addition of two transmitters E3 and E4 connected respectively to antennas A3 and A4 arranged to produce overlapping radiation beams similar to F1 and F2 but substantially at right angles thereto. The transmitters E3 and E4 are controlled by the generator G and are thus arranged to operate alternately with transmitters E1 and E2 at frequencies near those transmitters but differing therefrom. Two additional filters Z3 and Z4 and two additional amplifiers V3 and V4 are shown connecting the receiver with the indicator I1. One obtains on the indicator tube I1 Fig. 3b two images $n1$ and $n2$ in relation to two reference lines T1, T2, with which it is possible to read directly on the same indicator the exact direction of the obstacle in the space. The indicator tube I1 would receive signals from the two pairs of filters in succession so as to give indications having the shape of a cross, but it is clear that one can choose either four different frequencies with four selective filters and a receiver with a very wide band which can include the four transmitted bands, or any other appropriate commutation circuit with which one can utilize successively different frequencies that are more or less close to each other or united two by two by synchronizing the receiver on the transmitter by means of a suitable circuit, as shown in Fig. 7 where the commutating device is indicated at C1 and is synchronized with the transmitters by means of the connections to the generator G. This synchronization can, for example, use the different frequency in the spacing of the pulses. Any other appropriate means of synchronization can be used, either directly by the generator G which operates at the same time the commutation of the transmission antennas, and the commutation of the sweeping circuits of the cathode ray indicator or receiver.

According to another modification of the embodiment described, instead of making the indication appear as a crossed shaped line or as a vertical line, one can use directly the difference of the potentials received from the circuits V1, V2 of Fig. 1 to operate the two pairs of rectangular plates of the cathode ray tube in order to obtain a luminous line $n3$ Fig. 3c, which makes an angle with line T3 that is proportional to the difference of the potentials received simultaneously by V1 and V2. When the potentials are equal on V1 and V2, the line n3 is superposed on line T3, the latter being at 45° with each of the pairs of plates. On the same tube I2, one can also make a second indication n4 appear either alternately or simultaneously utilizing the circuit of Fig. 6, in order to see simultaneously the indications in the horizontal plane and in the vertical plane.

In order to dispense with commutation circuits, one can utilize (Fig. 4) two cathode ray tubes I3 and I4 having, for example, an indication n5 for the vertical plane and an indication n6 for the horizontal plane, these tubes being placed next to each other. One tube would be connected to the amplifiers V1 and V2 and the other to the amplifiers V3 and V4 of Fig. 6. Or by means of a suitable optical system (Fig. 5) it is possible to superpose these indications without it being necessary to alternate the same indicator tube. If the indications are similar, or for any other reason, one can use an indicator lamp I5 with fluorescent screen giving a green illumination and a lamp I6 with a fluorescent screen giving a blue illumination, or in a general manner, two different colors.

It is understood that the device described above can be applied to transmissions from the ground for reception on board an airplane which enables an airplane to find its way by itself; or inversely, the transmitter being placed on the airplane and the receiver on the ground, or both the receiver and transmitter being placed on board the airplane.

It is clear that in the above description, the known means utilized in the various combinations have not been described in detail. It is also clear that the invention is not limited to the examples of embodiment that have been shown and described, but on the contrary, many modifications and adaptations can be brought to it without leaving the field of the invention.

What is claimed is:

1. A radio guiding system for indicating the location with respect to said system of a reflecting object comprising a transmitter system, said transmitter system comprising means for alternately transmitting energy of different closely associated radio frequencies, the radiation patterns of said two frequencies covering spaces which overlap in part, said energy being transmitted to a reflecting object, a receiving system forming a part of said guiding system, said receiving system comprising means for receiving reflected energy of both said radio frequencies, means for distinguishing between said frequencies, means for amplifying the distinguished frequencies, an indicating system comprising a cathode ray tube, means to cause the differential between amplitudes of said two received frequencies to position the electron beam of said cathode ray tube in one direction, and means to cause said received frequencies to control the trace of said electron beam in another direction.

2. A radio guiding system according to claim 1 wherein said indicating system comprises means for indicating the distance and direction with respect to said reflecting object.

3. A radio guiding system according to claim 1 wherein said transmitter comprises means for alternately transmitting short impulses of energy at said frequencies.

4. A radio guiding system for indicating the location with respect to said system of a reflecting object comprising means to transmit two directional beams of radiation with substantially uniform overlapping intensity patterns providing a predetermined line of uniform intensity in the overlapping regions, means to give the radiation of each pattern a different characteristic, means to receive said transmission by reflection from an object to be located, means controlled by the different characteristics of the radiation to separate the signals from the different patterns, means for amplifying the separated signals, a cathode ray tube, means to position the electron beam of said tube in one direction by the differential between signals of said two patterns, and means to produce a visible trace of said beam in another direction when said signals are received.

5. A radio guiding system according to claim 4, in which the transmitting means is arranged to produce another pair of beams of radiation with overlapping intensity patterns arranged on opposite sides of said line of uniform intensity and in a plane substantially perpendicular to the plane of said other beams, and in which means are provided for alternately connecting the received signals to the deflecting circuits of said cathode ray tube so as to cause the differential between signals of one pair of said patterns to position the electron beam of said tube in one direction and the differential between signals of the other pair of patterns to position the electron beam of said tube in a direction substantially at right angles to said first direction.

6. A radio guiding system for indicating the location with respect to said system of a reflecting object comprising a transmitting means arranged to transmit four beams of radiation arranged symmetrically about a predetermined line having substantially uniform overlapping patterns, whereby said line is a line of uniform intensity for said four beams, means to cause said beams to be produced successively whereby each beam comprises a short impulse of radiated energy, only one beam being produced at a time, means to give each of said beams a different frequency from the others, means to receive signals from said beams reflected from an object to be located, filter means to separate the signals from the different beams, means for amplifying the separated signals, a cathode ray tube, means to determine the differential between received signals from the beams in one plane including said line and to utilize said differential to control the position of the electron beam of said cathode ray tube in one direction, means to cause a visible trace of the electron beam of said tube in another direction when the signals from said two beams are received, means to determine the differential of the signals received from said other two beams and to cause the electron beam of said tube to be positioned in another direction thereby, means to cause signals received from said other two beams to cause said electron beam to produce a visual trace on said tube, and means to cause said two differential obtaining means to be connected to said cathode ray tube alternately.

7. A radio guiding system for indicating the location with respect to said system of a reflecting object comprising a transmitting means arranged to transmit four beams of radiation arranged symmetrically about a predetermined line having substantially uniform overlapping patterns, whereby said line is a line of uniform intensity for said four beams, means to cause said beams to be produced successively, whereby each beam comprises a short impulse of radiated energy, only one beam being produced at a time, means to give each of said beams a different frequency from the others, means to receive signals from said beams reflected from an object to be located, filter means to separate the signals from the different beams, a cathode ray tube, means to determine the differential between received signals from the beams in one plane including said line and to utilize said differential to control the position of the electron beam of said cathode ray tube in one direction, means to cause a visible trace of the electron beam of said tube in another direction when the signals from said two beams are received, means to produce the differential of the signals received from said other two beams and to cause the electron beam of said tube to be positioned in another direction thereby, means to cause signals received from said other two beams to cause said electron beam to produce a visual trace on said tube, means to cause said two differential obtaining means to be connected to said cathode ray tube alternately, and an additional means connected to said receiving means to indicate the distance of said object from said system.

8. A radio guiding system according to claim 1 wherein said indicating system comprises means for giving more than one indication defining the position relative to said reflecting object.

9. A radio guiding system for indicating the location with respect to said system of a reflecting object comprising means to transmit radiations with substantially uniform overlapping intensity patterns providing a predetermined line of uniform intensity in the overlapping regions, the radiation of each pattern having a different characteristic from the others, means to receive said transmission by reflection from an object to be located, means controlled by the different characteristics of the radiation to separate the signals from the different patterns, means for amplifying the separated signals, a visual indicating device comprising a cathode ray tube in which the electron beam is deflected in one direction by received signals and the position of said beam in another direction is controlled by the differential between signals of two patterns on opposite sides of the line of uniform intensity, and means to determine the position of said indication by the differential between the signals of two patterns on opposite sides of said line of uniform intensity.

RENÉ JEAN HARDY.

REFERENCES CITED

The following references are of record in the file of this patent:

UNITED STATES PATENTS

| Number | Name | Date |
| --- | --- | --- |
| 2,118,917 | Finch | May 31, 1938 |
| 2,176,469 | Moueix | Oct. 17, 1939 |
| 2,251,997 | Goldmann | Aug. 12, 1941 |
| 2,255,569 | Peters | Sept. 9, 1941 |
| 2,277,464 | Taylor | Mar. 24, 1942 |
| 2,312,203 | Wallace | Feb. 23, 1943 |
| 2,403,622 | Tuska | July 9, 1946 |

FOREIGN PATENTS

| Number | Country | Date |
| --- | --- | --- |
| 435,072 | Great Britain | Sept. 13, 1935 |
| 497,147 | Great Britain | Dec. 9, 1938 |
| 553,618 | Great Britain | May 28, 1943 |